United States Patent [19]

Dalton et al.

[11] Patent Number: 4,686,684
[45] Date of Patent: Aug. 11, 1987

[54] BURIED LASER MIRROR WITH A MULTICOMPONENT REFLECTIVE INTERLAYER

[75] Inventors: Donald A. Dalton, Albuquerque, N. Mex.; James R. Strife, South Windsor; James L. Swindal, East Hampton, both of Conn.

[73] Assignee: United Technologies Corporation, Hartford, Conn.

[21] Appl. No.: 764,149

[22] Filed: Aug. 9, 1985

[51] Int. Cl.⁴ ............................................. H01S 3/08
[52] U.S. Cl. ................................................... 372/99
[58] Field of Search ......................... 372/99, 98, 46, 92

[56] References Cited

U.S. PATENT DOCUMENTS 4,309,670 1/1982 Burnham et al. ...................... 372/46

Primary Examiner—Gene Wan
Attorney, Agent, or Firm—J. Kevin Grogan

[57] ABSTRACT

A buried laser mirror used in high energy applications provides discrimination between optical signals of different wavelengths and comprises a ceramic substrate bonded to a faceplate that has a multicomponent reflective interlayer formed on the faceplate inner surface. The multicomponent reflective interlayer provides improved thermomechanical properties while maintaining the mirror's optical integrity and includes a metal reflective layer formed on the faceplate inner surface, a diffusion barrier layer fabricated on the metal reflective layer and a surface wetting layer formed on the diffusion barrier layer.

9 Claims, 3 Drawing Figures

BURIED LASER MIRROR WITH A MULTICOMPONENT REFLECTIVE INTERLAYER

DESCRIPTION

1. Technical Field

This invention relates to laser mirrors and more particularly to buried laser mirrors with reflective diffusion barriers.

2. Background Art

The light emitted from a target object after laser irradiation can provide feedback to the laser's alignment and guidance systems. A portion of this light is directed back along the optic path of the incident beam, allowing the optical components of the laser system to perform the dual functions of sending and receiving optical signals to and from the object. To accomplish both functions, the laser system must separate the reflected beam from the beam incident on the target so that information on the object's location condition may be extracted.

Mirrors which are transmissive at certain wavelengths and reflective at others are well known in the art, as are mirrors having more than one reflective surface, each of which reflect at a different wavelength.

In wavelength discriminative systems of the prior art, a buried mirror has been used to separate the incident beam from the beam returning from the irradiated object. In addition to the mirror's outer surface which reflects the light from the high energy laser, there is another surface contained or "buried" within the mirror that reflects the light of the returning beam because the material between the first surface and buried surface is selected to be transmissive at the wavelength of the returning light.

Recently, the buried mirror concept has been adapted for use with High Energy Lasers (HEL), including shared aperture sampler optical systems to improve their pointing and tracking accuracy. The energy intensity attained in these systems results in a substantial increase in the operating temperatures of the optical components. Conventional fabrication techniques for these mirrors are inadequate given the tremendous thermal loads experienced by the components during operation.

Buried laser mirrors used in high energy applications of the prior art comprise a ceramic substrate such as silicon carbide with a percentage of free silicon bonded to a silicon faceplate by a ceramic transient liquid phase bonding technique disclosed in applicants' copending U.S. application Ser. No. 484,102, and described hereinafter with respect to FIG. 2. The mirror is formed by locating a metal foil between the substrate and faceplate. When heated, metal foil atoms diffuse into the substrate and are replaced by atoms of the ceramic material. Upon cooling, the metal phase separates, forming metal clusters displaced from the substrate faceplate interface. In addition, the mirror may be constructed with channels for coolant flow to remove the heat generated during operation.

Mirrors fabricated with this process possess superior thermal properties but have serious optical limitations. Because the aforementioned bonding process is diffusive in nature, there is no surface delineated within the material sufficiently distinct to adequately reflect the returning beam. Consequently, the optical properties of the interface including the metal clusters that remain between the silicon carbide substrate and the silicon layer are quite poor. The interface surface that must act as a mirror is marked by rough textured regions whose boundaries are vaguely defined. As a result, the quality of the image produced by mirrors of the prior art are inadequate.

Cooled mirrors constructed with other bonding techniques such as epoxy bondinq or similar adhesives do not disturb the intrinsic optical surface properties but possess thermal characteristics and dimensional instabilities that are inferior to those mirrors fabricated as described hereinbefore.

DISCLOSURE OF INVENTION

The object of the present invention is to provide a buried laser mirror with a diffusion limiting multicomponent reflective interlayer having improved optical properties.

According to the present invention, a multicomponent reflective interlayer which provides an interior reflecting surface in a buried mirror having a faceplate bonded to a substrate comprises a reflective metal layer deposited on the faceplate surface that abuts the substrate, a diffusion barrier layer that is deposited on the reflecting metal layer limiting the diffusion of a bonding agent, and a surface wetting layer deposited on the diffusion layer for reducing the surface tension between the bonding agent applied thereto.

According to another aspect of the present invention, a buried laser mirror that is responsive to first and second optical signals having different wavelengths comprises a faceplate that has a first surface providing for reflection of the first optical signal and transmission of the second optical signal therethrough to a second optical surface and further includes a ceramic substrate that has a surface formed to receive the second surface of the faceplate. The buried mirror further comprises a metal reflective layer that is deposited on the second surface of the faceplate, a diffusion barrier layer deposited on the reflective metal layer and a surface wetting layer deposited on the diffusion barrier for reducing the surface tension thereon. Also included in the buried mirror of the present invention is a bonding agent that is applied to the surface wetting layer to affix the faceplate to the substrate.

BEST MODE FOR CARRYING OUT THE INVENTION

Figure 1:
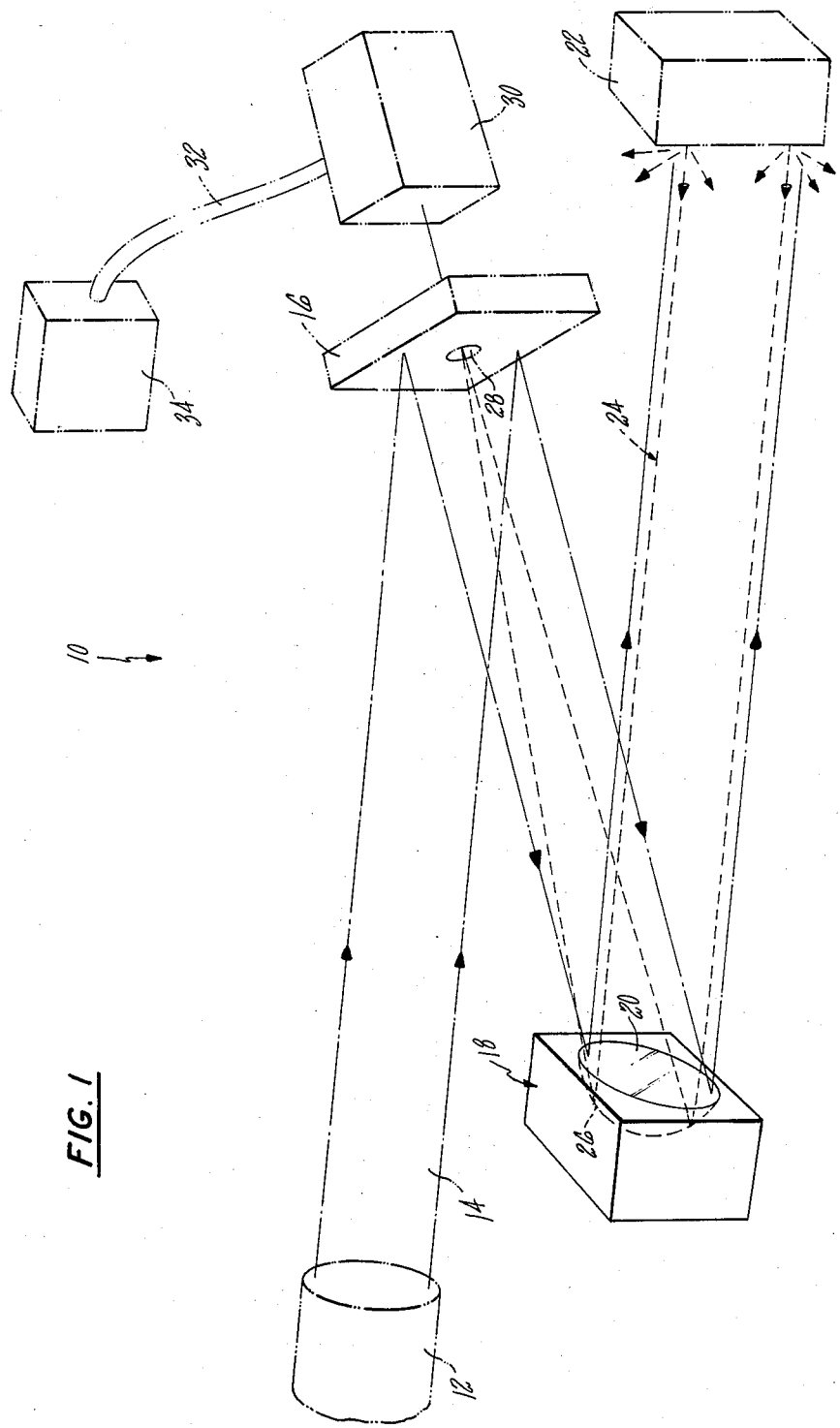
FIG. 1 is a perspective block diagram of a shared aperture high energy laser system with a buried laser mirror having a multicomponent reflective interlayer provided according to the present invention.

Referring to FIG. 1, in a perspective block diagram of a shared aperture high energy laser system, a shared aperture high energy laser system 10 includes laser 12 which provides a coherent beam of high energy light. In the best mode embodiment, the laser source comprises a chemical laser although those skilled in the art will recognize that an equivalent high energy laser emitting light with a wavelength between 0.48 and 14 microns may be used. High energy laser beam 14 emitted by the laser is directed towards a HEL beam transfer system which may include a series of focusing optics that are well known in the art and are not part of the present invention, and further includes hole coupling mirror 16 which reflects the laser beam and directs it to buried laser mirror 18.

As hereinafter detailed in FIG. 2, buried laser mirror 18 is a composite structure having a faceplate bonded to a substrate with a multicomponent reflective interlayer provided therebetween. The buried laser mirror also comprises cooling channels of a conventional design that are fabricated within the mirror substrate. However, those skilled in the art will recognize that an uncooled substrate may be equivalently substituted. The buried laser mirror has an outer surface 20 which reflects the laser beam and directs it towards target 22.

Upon receiving the high energy laser beam, the target object radiates light over a broad band of wavelengths. Those skilled in the art will realize that the wavelength of the light emitted by the radiated target object most probably is between 3 and 20 microns. A portion of this light is directed back along the high energy laser beam optical path and comprises target emission beam 24 which strikes the buried laser mirror on outer surface 20. The material of the faceplate is selected so as to be transmissive at the wavelength of the light radiated by the target.

The target emission beam strikes buried surface 26 within the buried laser mirror formed by a multicomponent reflective interlayer detailed hereinafter with respect to FIG. 3. In the best mode embodiment, the buried laser mirror provided according to the present invention is used in a shared aperture high energy laser system. Therefore, the shape of the buried surface is selected to focus the target emission beam so that it will pass through or around aperture 28 located in hole coupling mirror 16 and be provided to diagnostic signal processor 30. The radius of curvature of the buried surface has been greatly exaggerated for illustrative purposes and in the best mode embodiment comprises a radius of curvature between 3 and 30 meters.

Both the hole coupling mirror and the diagnostic signal processor are of a type well known in the art. In the best mode embodiment the hole coupling mirror is of a type known in the art and has an appropriately shaped aperture contained therein. Signal processor 30 comprises a photodetector of a type known in the art and any requisite signal amplifier that produces an electrical signal equivalent of the received target beam intensity. The signal processor provides a feedback signal along lines 32 to laser control circuitry 34 (not part of the present invention) that is indicative of the intensity of the received target beam.

Figure 2:
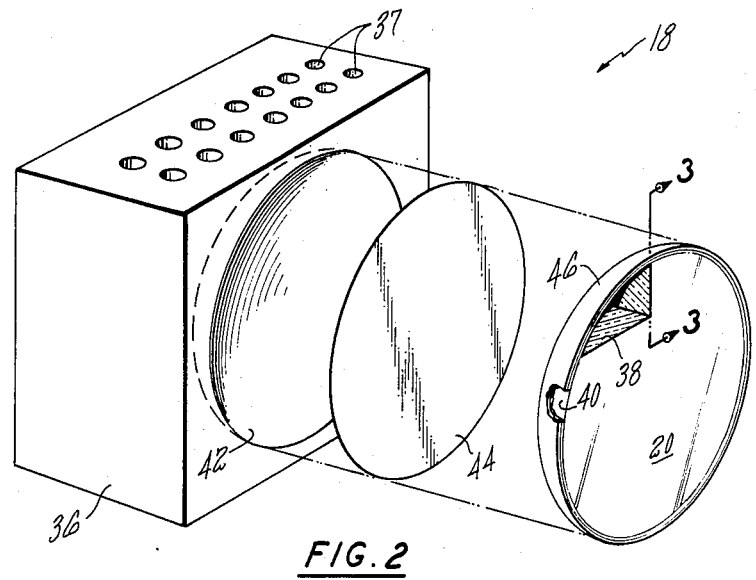
FIG. 2 is an illustration partially in perspective and partially in section of the buried laser mirror of FIG. 1.

FIG. 2 contains an exploded perspective illustration of buried laser mirror 18 of FIG. 1. The buried laser mirror comprises a cooled substrate 36 which is selected to be a ceramic such as siliconized silicon carbide and has cooling channels 37 contained therein allowing a conventional liquid coolant, such as ammonia to pass therethrough. The dimensions of the substrate are dependent in part on those of the faceplate and cooling channels. In the best mode embodiment a substrate comprising Coors SC-1 silicon carbide is used having between 10-20% volume fraction of free silicon. Those skilled in the art will note that other equivalent materials can be substituted.

In the best mode embodiment the buried laser mirror also comprises faceplate 38 that is approximately 15 thousandths of an inch thick and has an outer surface (20, FIG. 1) polished to an optical figure for reflecting the incident high energy laser beam, typically 30 to 50 thousandths of an inch sagittal contour. The materials of the faceplate are selected to reflect light at the wavelength of the high energy laser beam and transmit light at the wavelength of the returning target emission beam and comprises silicon in the best mode embodiment. As described hereinbefore with respect to FIG. 1, the geometry of faceplate inner surface 40 is selected in dependence on the focusing required of the target emission beam by the shared aperture high energy laser system.

Cavity 42 is formed in the substrate to receive the faceplate inner surface and provide good mechanical and thermal contact. The surfaces of both the substrate cavity and the faceplate inner surface are machined by conventional techniques to final dimensions within a tolerance of five ten-thousandths of an inch. The faceplate is bonded to the substrate by the bonding technique described hereinafter. In the best mode embodiment metal foil 44 comprises No. 713 Aluminum approximately one thousandth of an inch thick is placed in the cavity to act as a bonding agent, with the faceplate disposed therein. A contact pressure of approximately 1–2 pounds per square inch is sufficient for bonding purposes. This mirror assembly is heated to a temperature of 800° C. for thirty minutes in a vacuum.

At the elevated temperature the liquid metal wets multicomponent reflective interlayer 46, detailed hereinafter with respect to FIG. 3, and diffuses into the silicon carbide substrate allowing the free silicon contained therein to migrate to the multicomponent reflective interlayer and form a bond therewith. The multicomponent reflective interlayer provided according to the present invention provides a uniform reflective surface within the buried mirror.

Figure 3:
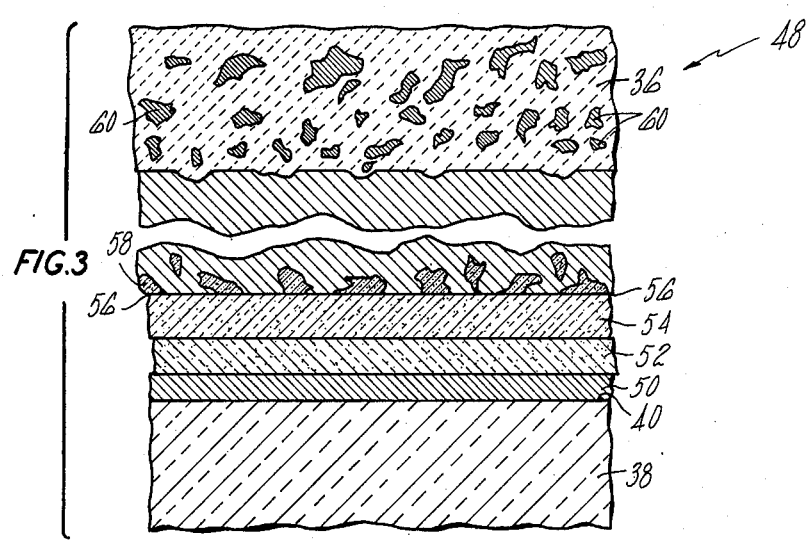
FIG. 3 is a sectioned illustration of a multicomponent reflective interlayer provided according to the present invention.

Referring now to FIG. 3, there is illustrated a sectioned view 48 of the multicomponent reflective interlayer (46, FIG. 2) provided according to the present invention after the bonding process described hereinabove has been completed, and includes a sectioned view of faceplate 38 and substrate 36. The multicomponent reflective interlayer includes reflective layer 50 comprising chromium, platinum or other reflective material that is deposited by sputtering or other conventional techniques onto the faceplate inner surface (40, FIG. 2). In the best mode embodiment, the reflective layer comprises a layer of chromium approximately 1,000 Å thick.

Deposited on the reflective layer is diffusion barrier layer 52 which comprises a layer of silicon nitride ($Si_3N_4$) of a thickness approximately 2,000 Å that is deposited by sputtering, chemical vapor deposition or other conventional techniques. Deposited on the silicon nitride diffusion barrier layer is a surface tension reduction layer 54 comprised of silicon dioxide ($SiO_2$) of approximately 2000 Å in thickness which lowers the surface tension between the aluminum used in the bonding process and the diffusion barrier layer. Those skilled in the art will recognize that other thin film layers may be used for a diffusion barrier layer. Correspondingly, other thin films may be substituted to provide reduced surface tension.

After forming the multicomponent reflective interlayer on the faceplate inner surface, the silicon faceplate, silicon carbide substrate and aluminum foil are assembled as hereinbefore described. When heated, the bonding agent diffuses into the substrate and wets the multicomponent reflective interlayer. Free silicon located in the silicon carbide matrix migrates toward a bond line 56 formed at the interface between the metal foil and silicon dioxide. After cooling, the bond line consists of an aluminum-silicon eutectic microstructure and primary grains of free silicon 58, some of which are present throughout the metal layer.

The reduction in surface tension provided by the silicon dioxide layer provides sufficient lateral migration of the aluminum molecules to insure even diffusion of the aluminum, yielding a bond marked by uniform mechanical strength and thermal conductivity. The penetration of the diffusing aluminum towards the faceplate is limited by the layer of silicon nitride. The diffusion barrier layer prevents the diffusing aluminum atoms from reaching the reflective layer, thereby maintaining its optical integrity. The elevated temperature is selected to be above the melting point of the metal and below the melting point of the substrate and faceplate materials. The time provided for heating is selected to allow sufficient silicon and metal atom migration. Those skilled in the art will note that if other metals and ceramic materials are substituted different values of temperature and time may be selected.

Upon cooling, the migrated metal phase approximately separates from the surrounding matrix to form clusters 60 displaced from the bond line at the interface. After bonding the bond line has poor definition and provides inadequate optical performance. However, a buried laser mirror having a multicomponent reflective inner layer provided according to the present invention reflects all of the energy of the returning beam at metal reflective layer 50. Therefore the optical performance degradation associated with the bond line are avoided.

Similarly, although the invention has been shown and described with regard to a best mode embodiment, it should be understood by those skilled in the art that various other changes, omissions, and additions thereto may be made therein without departing from the spirit and scope of the invention.

We claim:

1. A multicomponent reflective interlayer which provides an interior reflective surface in a buried mirror having a faceplate bonded to a substrate, comprising:

metal reflective means deposited on a faceplate surface abutting the substrate;
   silicon nitride diffusion barrier means deposited on said reflective metal means for providing a limit to the diffusion of a bonding means therein; and
   silicon dioxide surface wetting means deposited on said diffusion barrier means for providing a reduction in surface tension for said bonding means applied thereto.

2. The multicomponent reflective interlayer of claim 1, wherein said reflective means comprises a layer of chromium.

3. The multicomponent reflective interlayer of claim 1, wherein said reflective means comprises a layer of platinum.

4. A buried laser mirror responsive to a first optical signal having a first wavelength and a second optical signal having a second wavelength, comprising:

faceplate means having first and second surfaces for providing reflection of the first optical signal at said first surface and for providing transmission of the second optical signal therethrough;
   ceramic substrate means having a surface formed therein to receive said faceplate second surface;
   metal reflective layer means deposited on said faceplate means second surface for providing reflection of the second optical signal;
   silicon nitride diffusion barrier layer means deposited of said reflective metal layer means;
   silicon dioxide surface wetting layer means deposited on said diffusion barrier layer means for reducing surface tension thereon; and
   bonding means applied to said surface wetting layer means for affixing said faceplate means to said substrate means.

5. The buried laser mirror of claim 4, wherein said metal reflective layer means comprises chromium.

6. The buried laser mirror of lcaim 4, wherein said metal reflective layer means comprises platinum.

7. The buried laser mirror of claim 4, wherein said faceplate means comprises silicon.

8. The buried laser mirror of claim 4, wherein said ceramic substrate means comprises silicon carbide.

9. The buried laser mirror of claim 4, wherein said ceramic substrate means further comprises cooling channel means for removing heat to a coolant flowing therethrough.

* * * * *

UNITED STATES PATENT AND TRADEMARK OFFICE
CERTIFICATE OF CORRECTION

PATENT NO. : 4,686,684

DATED : August 11, 1987

INVENTOR(S) : Donald A. Dalton, James R. Strife and James L. Swindal

It is certified that error appears in the above-identified patent and that said Letters Patent is hereby corrected as shown below:

Claim 6, column 6, line 38 "lcaim" should read --claim--

Signed and Sealed this

Tenth Day of July, 1990

Attest:

HARRY F. MANBECK, JR.

*Attesting Officer*   *Commissioner of Patents and Trademarks*